US008434587B2

(12) United States Patent
Era et al.

(10) Patent No.: US 8,434,587 B2
(45) Date of Patent: May 7, 2013

(54) TUBULAR BODY SOUNDPROOF COVER AND COVERED TUBULAR BODY

(75) Inventors: Kazuki Era, Komaki (JP); Hiroyuki Ochiai, Kasugai (JP)

(73) Assignee: Tokai Rubber Industries, Ltd., Aichi-Ken (JP)

( * ) Notice: Subject to any disclaimer, the term of this patent is extended or adjusted under 35 U.S.C. 154(b) by 0 days.

(21) Appl. No.: 13/359,084

(22) Filed: Jan. 26, 2012

(65) Prior Publication Data

US 2012/0118664 A1 May 17, 2012

Related U.S. Application Data

(63) Continuation of application No. PCT/JP2011/066354, filed on Jul. 19, 2011.

(30) Foreign Application Priority Data

Sep. 28, 2010 (JP) ................................. 2010-217773

(51) Int. Cl.
| | |
|---|---|
| *G10K 11/00* | (2006.01) |
| *B65C 3/26* | (2006.01) |
| *B29C 65/00* | (2006.01) |
| *B28B 7/32* | (2006.01) |

(52) U.S. Cl.
USPC ........... 181/196; 156/156; 156/285; 156/286; 156/287; 156/294; 264/314

(58) Field of Classification Search ................... 181/196; 156/156, 285; 264/314
See application file for complete search history.

(56) References Cited

U.S. PATENT DOCUMENTS

| | | | | |
|---|---|---|---|---|
| 2,593,714 A | * | 4/1952 | Robinson | 156/156 |
| 3,666,583 A | * | 5/1972 | Pei et al. | 65/34 |
| 4,243,298 A | * | 1/1981 | Kao et al. | 385/128 |
| 4,637,909 A | * | 1/1987 | Lucca | 264/510 |
| 4,680,066 A | * | 7/1987 | Wood | 156/156 |
| 5,016,675 A | * | 5/1991 | Igarashi et al. | 138/125 |
| 5,090,668 A | * | 2/1992 | Hamada | 267/141 |
| 5,242,517 A | * | 9/1993 | Endoh | 156/92 |
| 5,460,772 A | * | 10/1995 | Ohta | 264/515 |
| 5,476,120 A | * | 12/1995 | Brunnhofer | 138/137 |
| 6,136,135 A | * | 10/2000 | Kamiyama et al. | 156/294 |

(Continued)

FOREIGN PATENT DOCUMENTS

| | | |
|---|---|---|
| JP | 2-135661 | 11/1990 |
| JP | 05-126002 | 5/1993 |

(Continued)

*Primary Examiner* — David Warren
*Assistant Examiner* — Christina Russell
(74) *Attorney, Agent, or Firm* — Greenblum & Bernstein P.L.C.

(57) ABSTRACT

A purpose is to provide a tubular body soundproof cover and a covered tubular body, for which elastic deformation of the tubular body is unlikely to be inhibited. The tubular body soundproof cover includes a sound absorbing layer arranged on outside in an axially perpendicular direction of a tubular body having tubular body side curved sections; a skin layer arranged on outside in the axially perpendicular direction of the sound absorbing layer; and cover side curved sections arranged on outside in the axially perpendicular direction of the tubular body side curved sections, including at least a portion of the sound absorbing layer and at least a portion of the skin layer. The cover side curved sections have non-adherent sections in which the sound absorbing layer and the skin layer are not bonded over the entire circumferential length.

9 Claims, 11 Drawing Sheets

U.S. PATENT DOCUMENTS

| | | | |
|---|---|---|---|
| 6,439,359 B1 * | 8/2002 | Kato et al. | 188/379 |
| 8,020,677 B2 * | 9/2011 | Hasegawa et al. | 188/378 |
| 2009/0229696 A1 * | 9/2009 | Warren | 138/98 |

FOREIGN PATENT DOCUMENTS

| | | | | |
|---|---|---|---|---|
| JP | 05126002 A | * | 5/1993 | |
| JP | 07248776 A | * | 9/1995 | |
| JP | 10-306716 | | 11/1998 | |
| JP | 10306716 A | * | 11/1998 | |
| JP | 2002295320 A | * | 10/2002 | |
| JP | 2003-343373 | | 12/2003 | |
| JP | 2003343373 A | * | 12/2003 | |

* cited by examiner

TUBULAR BODY SOUNDPROOF COVER AND COVERED TUBULAR BODY

CLAIM FOR PRIORITY

This application is a continuation of PCT/JP2011/066354 filed Jul. 19, 2011, and claims the priority benefit of Japanese Application No. 2010-217773, filed Sep. 28, 2010, the contents of which is expressly incorporated by reference in its entirety.

TECHNICAL FIELD

The present invention relates to a soundproof cover for a tubular body and a covered tubular body, the tubular body soundproof cover inhibiting sound inside a tubular body from escaping to the outside.

TECHNICAL BACKGROUND

For example, in Patent Document 1, a tubular body soundproof cover installed on an air intake pipe is disclosed. The tubular body soundproof cover disclosed in the patent document includes a sound absorbing layer and an outer skin layer. The sound absorbing layer is made of a urethane foam molded product and covers an outer peripheral surface of the air intake pipe. The outer skin layer is made of a PVC (polyvinyl chloride) sheet and covers an outer peripheral surface of the sound absorbing layer.

As described in a paragraph [0018] of the patent document, the outer skin layer is bonded to the sound absorbing layer. Specifically, the outer skin layer is arranged in advance in a cavity of a mold, and then a raw material is casted into the cavity to foam-mold the sound absorbing layer. That is, the formation of the sound absorbing layer and the entire bonding between the outer skin layer and the sound absorbing layer are simultaneously performed.

RELATED ART

Patent Document

Patent Document 1: Japanese Patent Laid-Open Publication No. HEI 10-306716

SUMMARY OF THE INVENTION

Problems to be Solved by the Invention

In a case where the tubular body is installed on an apparatus that has at least one axial end that vibrates, such as a turbo air hose, a relative positional relationship between the one axial end and the other axial end changes according the vibration. For this reason, it is necessary for the tubular body to absorb the change in the positional relationship via elastic deformation of the tubular body itself.

Here, of the tubular body soundproof cover, the sound absorbing layer is made of a urethane foam molded product. For this reason, the sound absorbing layer extends and contracts easily. That is, the sound absorbing layer is unlikely to restrict the deformation of the tubular body. In contrast, the skin layer is made of a PVC sheet. For this reason, as compared to the sound absorbing layer, it is unlikely for the skin layer to extend and contract. That is, as compared to the sound absorbing layer, the skin layer is likely to restrict the deformation of the tubular body. As described above, the elastic deformation of the tubular body is unlikely to be restricted by the sound absorbing layer but is likely to be restricted by the skin layer.

However, the skin layer and the sound absorbing layer are entirely bonded. For this reason, the extension and contraction of the sound absorbing layer is restricted by the skin layer. That is, the elastic deformation of the tubular body is indirectly restricted by the skin layer via the sound absorbing layer. For this reason, it is unlikely for the tubular body installed with the tubular body soundproof cover to deform. Therefore, the tubular body cannot absorb the change in the relative positional relationship between the one axial end and the other axial end.

A tubular body soundproof cover and a covered tubular body according to the present invention are accomplished in view of the above problems. A purpose of the present invention is to provide a soundproof cover for a tubular body and a covered tubular body, for which elastic deformation of the tubular body is less likely to be inhibited.

Means for Solving the Problems (1) To solve the above problems, a tubular body soundproof cover of the present invention includes a sound absorbing layer arranged on outside in an axially perpendicular direction of a tubular body, the tubular body having two axial ends and a tubular body side curved section provided between the two axial ends, the two axial ends having a changing relative positional relationship, and the axially perpendicular direction being perpendicular to an axial direction of the tubular body; an outer skin layer arranged on outside in the axially perpendicular direction of the sound absorbing layer; and a cover side curved section arranged on outside in the axially perpendicular direction of the tubular body side curved section, including at least a portion of the sound absorbing layer and at least a portion of the skin layer. The cover side curved section has a non-adherent section where the sound absorbing layer and the skin layer are not bonded over an entire circumferential length. Here, the "axial direction" means an extension direction of the tubular body.

The relative positional relationship of the two axial ends of the tubular body changes due to vibration of an apparatus to which the tubular body is connected. In this case, it is necessary for the tubular body to absorb the change in the positional relationship via elastic deformation of the tubular body itself.

Here, of the tubular body, a portion having a large deformation amount is the tubular body side curved section. In other words, of the turbo body, the portion having a large absorption amount of change in the positional relationship is the tubular body side curved section.

The cover side curved section of the tubular body soundproof cover of the present invention covers the tubular body side curved section from outside in the axially perpendicular direction. The cover side curved section has the non-adherent section. In the non-adherent section, the sound absorbing layer and the skin layer are not bonded over the entire circumferential length. For this reason, the deformation of the sound absorbing layer is unlikely to be restricted by the skin layer. Therefore, the elastic deformation of the tubular body side curved section is unlikely to be restricted by the skin layer.

(1-1) It is desirable that, in the configuration of the above aspect (1), the skin layer have a smaller bending rigidity than the sound absorbing layer. According to the present configuration, the skin layer deforms more easily than the sound absorbing layer. For this reason, the deformation of the sound absorbing layer is unlikely to be restricted by the skin layer.

Therefore, the elastic deformation of the tubular body side curved section is unlikely to be restricted by the skin layer.

(2) It is desirable that, in the configuration of the above aspect (1), the cover side curved section has a constant curvature; and the non-adherent section is provided to include a section ranging from a 30% position to a 70% position when one axial end of the cover side curved section is a 0% position and the other axial end of the cover side curved section is a 100% position.

According to the present configuration, of the entire axial length of the cover side curved section, the non-adherent section is provided to include a section of ±20% centered at a 50% position. The 50% position is used as the center, because, in the cover side curved section, the 50% position is most likely to have a large deformation amount.

The non-adherent section is provided to include a section ranging from the 30% position to the 70% position, because a position less than the 30% position or more than the 70% position is far away from the 50% position, and thus is unlikely to have a large deformation amount.

(3) It is desirable that, in the configuration of the above aspect (1), the cover side curved section be formed by joining a plurality of unit sections in the axial direction, the plurality of unit sections being curved toward a same direction; and the non-adherent section be provided to be a unit section having largest curvature among the plurality of unit sections.

Among the plurality of unit sections, the unit section that is most likely to have a large deformation amount is the unit section having the largest curvature (the most steeply curved unit section). According to the present configuration, the non-adherent section is provided to be this unit section. For this reason, even when the non-adherent section is small, it is possible to make the elastic deformation of the tubular body unlikely to be restricted.

(4) It is desirable that, in the configuration of the above aspect (3), the non-adherent section be provided to include a section ranging from a 30% position to a 70% position when one axial end of the unit section having the largest curvature is a 0% position and the other axial end of the unit section having the largest curvature is a 100% position.

According to the present configuration, of the entire axial length of the unit section having the largest curvature, the non-adherent section is provided to include the section of ±20% centered at the 50% position. The 50% position is used as the center, because, in the unit section, the 50% position is most likely to have a large deformation amount.

The non-adherent section is provided to include the section ranging from the 30% position to the 70% position, because a position less than the 30% position or more than the 70% position is far away from the 50% position, and thus is unlikely to have a large deformation amount.

(5) It is desirable that, in the configuration of any one of the above aspects (1)-(4), the sound absorbing layer have a sound absorbing layer side section included in the non-adherent section; and an inner recess be provided on an inner peripheral surface of the sound absorbing layer side section, providing an inner clearance between an outer peripheral surface of the tubular body side curved section and the inner peripheral surface of the sound absorbing layer side section over the entire axial length and the entire circumferential length of the non-adherent section.

According to the present configuration, contact area between the outer peripheral surface of the tubular body side curved section and the inner peripheral surface of the sound absorbing layer side section can be reduced by the area where the inner clearance is provided. For this reason, the sound absorbing layer is unlikely to restrict the elastic deformation of the tubular body.

(6) It is desirable that, in the configuration of any one of the above aspects (1)-(5), the sound absorbing layer have a sound absorbing layer side section included in the non-adherent section; the skin layer have a skin layer side section included the non-adherent section; and an outer clearance be provided between an outer peripheral surface of the sound absorbing layer side section and an inner peripheral surface of the skin layer side section, occupying at least a portion of the non-adherent section.

According to the present configuration, contact area between the outer peripheral surface of the sound absorbing layer side section and the inner peripheral surface of the skin layer side section can be reduced by the area where the outer clearance is provided. For this reason, the skin layer is unlikely to restrict the elastic deformation of the tubular body.

(6-1) It is desirable that, in the configuration of the above aspect (6), on at least one of the outer peripheral surface of the sound absorbing layer side section and the inner peripheral surface of the skin layer side section, an outer recess be arranged providing the outer clearance. According to the present configuration, the outer clearance can easily be provided.

(6-2) It is desirable that, in the configuration of the above aspect (6), on at least one of the outer peripheral surface of the sound absorbing layer side section and the inner peripheral surface of the skin layer side section, a concave-convex portion be arranged. According to the present configuration, the outer clearance can easily be provided.

(6-3) It is desirable that, in the configuration of the above aspect (6-2), the concave-convex portion be formed by arranging numerous convex portions on at least one of the outer peripheral surface and the inner peripheral surface. According to the present configuration, the outer clearance can easily be provided.

(6-4) It is desirable that, in the configuration of the above aspect (6-2), the concave-convex portion be formed by arranging ribs projecting radially on at least one of the outer peripheral surface and the inner peripheral surface. According to the present configuration, the outer clearance can easily be provided.

(6-5) It is desirable that, in the configuration of the above aspect (6-2), the concave-convex portion be formed on the inner peripheral surface by arranging a bellows portion extendable and contractible in the axial direction on the skin layer side section. According to the present configuration, the outer clearance can easily be provided. Further, due to the extension and contraction of the bellows portion, the skin layer is unlikely to restrict the elastic deformation of the tubular body.

(7) It is desirable that, in the configuration of any one of the above aspects (1)-(6), the skin layer have a skin layer side section included in the non-adherent section, the skin layer side section having a lower rigidity than other portions of the skin layer excluding the skin layer side section.

According to the present configuration, as compared to other portions of the skin layer excluding the skin layer side section, the skin layer side section is easily elastically deformable. For this reason, the skin layer is unlikely to restrict the elastic deformation of the tubular body.

(7-1) It is desirable that, in the configuration of the above aspect (7), the skin layer side section have a thinner wall thickness in the axially perpendicular direction than other portions of the skin layer excluding the skin layer side section. According to the present configuration, by making the wall thickness in the axially perpendicular direction thin, the rigidity of the skin layer side section can easily be reduced.

(8) It is desirable that, in the configuration of any one of the above aspects (1)-(7), the sound absorbing layer be formed from a plurality of sound absorbing layer side segments joining in the circumferential direction; the skin layer be formed from a plurality of skin layer side segments joining in the circumferential direction; and seams between circumferentially neighboring sound absorbing layer side segments and seams between circumferentially neighboring skin layer side segments be arranged at positions circumferentially shifted from each other.

According to the present configuration, as compared to the case where the seams between circumferentially neighboring skin layer side segments and the seams between circumferentially neighboring sound absorbing layer side segments are not arranged at positions circumferentially shifted from each other (the case where two seams are joined in a shape of a straight line in the axially perpendicular direction), sound inside the tubular body is unlikely to escape to the outside.

(9) To solve the above problems, a covered tubular body of the present invention includes a tubular body soundproof cover having a configuration according to any one of the above aspects (1)-(8); and a tubular body having the tubular body soundproof cover installed on an outer peripheral surface of the tubular body.

According to the covered tubular body of the present invention, the cover side curved section of the tubular body soundproof cover covers the tubular body side curved section from outside in the axially perpendicular direction. The cover side curved section has the non-adherent section. In the non-adherent section, the sound absorbing layer and the skin layer are not bonded over the entire circumferential length. For this reason, the deformation of the sound absorbing layer is unlikely to be restricted by the skin layer. Therefore, the elastic deformation of the tubular body side curved section is unlikely to be restricted by the skin layer.

Effect of the Invention

According to the present invention, a tubular body soundproof cover and a covered tubular body, for which elastic deformation of the tubular body is unlikely to be inhibited, can be provided.

DESCRIPTION OF REFERENCE NUMERALS

Figure 1:
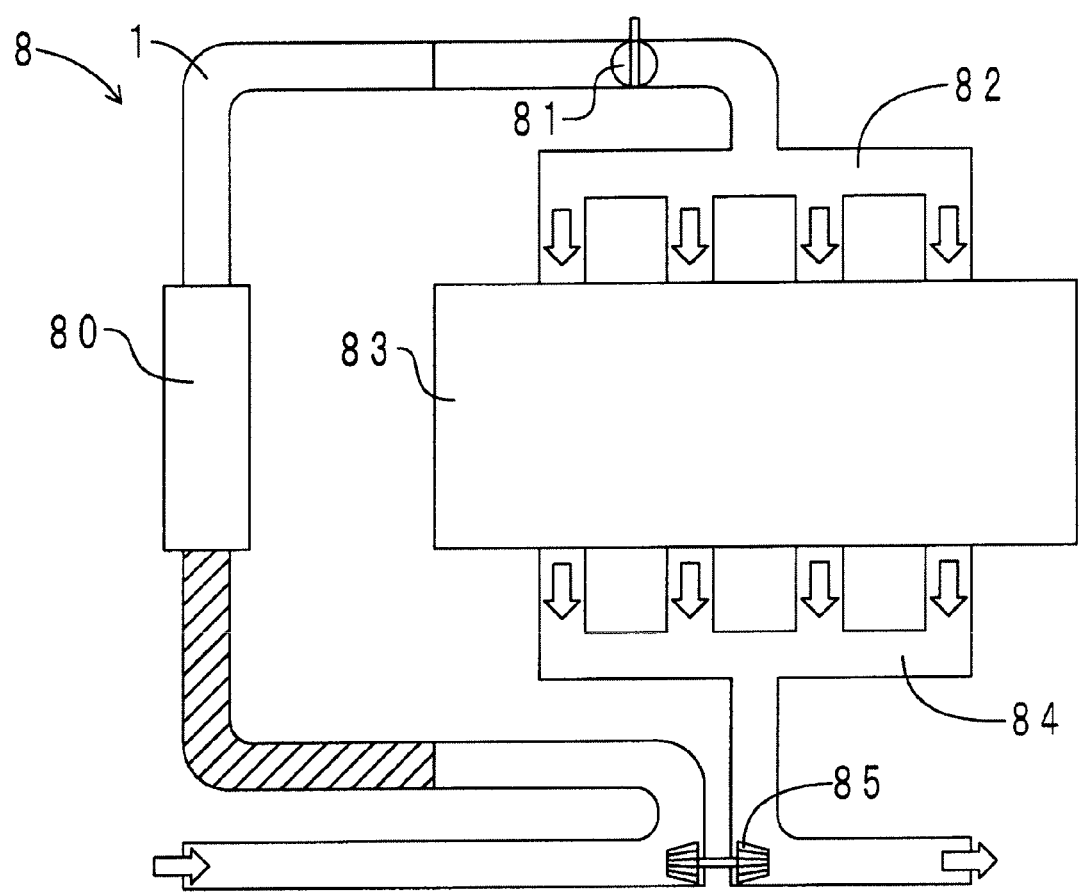
FIG. 1 is an arrangement view of a covered tubular body according to a first embodiment.

1: covered tubular body
2: tubular body soundproof cover
3: sound absorbing layer
3a: first sound absorbing layer side segment
3b: second sound absorbing layer side segment
4: skin layer
4a: first skin layer side segment
4b: second skin layer side segment
5f: cover side curved section
5r: cover side curved section
6: turbo air hose (tubular body)
8: air intake system
30af: first sound absorbing layer side section
30ar: first sound absorbing layer side section
30bf: second sound absorbing layer side section
30br: second sound absorbing layer side section
30f: sound absorbing layer side section
30r: sound absorbing layer side section
31af: first inner clearance
31ar: first inner clearance
31bf: second inner clearance
31f: inner clearance
31r: inner clearance
32af: first inner recess
32ar: first inner recess
32bf: second inner recess
32f: inner recess
32r: inner recess
33af: first outer clearance
33ar: first outer clearance
33bf: second outer clearance
33f: outer clearance
33r: outer clearance
34af: first outer recess
34ar: first outer recess
34bf: second outer recess
34br: second outer recess
34f: outer recess
34r: outer recess
35af: convex portion
35bf: convex portion
40: skin layer side section
40af: first skin layer side section
40ar: first skin layer side section
40bf: second skin layer side section
40br: second skin layer side section
40f: skin layer side section
40r: skin layer side section
41af: bellows portion
41bf: bellows portion
50f: non-adherent section
50r: non-adherent section
60f: upstream end
60r: downstream end
62f: tubular body side curved section
62r: tubular body side curved section
70f: fastener ring
70r: fastener ring
71: tubular body
72: tubular body soundproof cover
80: intercooler
81: throttle valve 82: intake manifold
83: engine
84: exhaust manifold
85: turbocharger
710: tubular body side curved section
710a: unit section
720: cover side curved section
720a: unit section
720b: unit section
730: non-adherent section
L1b: one axial end
L1f: one axial end
L1r: one axial end
L2b: other axial end
L2f: other axial end
L2r: other axial end
L3b: 50% location
L3f: 50% location
L3r: 50% location
O1: curvature center
O2: curvature center
θ1: center angle

MODE FOR CARRYING OUT THE INVENTION

In the following, embodiments of a tubular body soundproof cover and a covered tubular body of the present invention are explained.

First Embodiment

[Arrangement and Configuration of Covered Tubular Body]

First, arrangement and configuration of a covered tubular body of the present embodiment is explained. FIG. 1 illustrates an arrangement view of the covered tubular body of the present embodiment. As FIG. 1 illustrates, an air intake system 8 includes an intercooler 80, a throttle valve 81, an intake manifold 82, an engine 83, an exhaust manifold 84, and a turbocharger 85. A covered tubular body 1 is installed on a downstream side of the intercooler 80.

Figure 2:
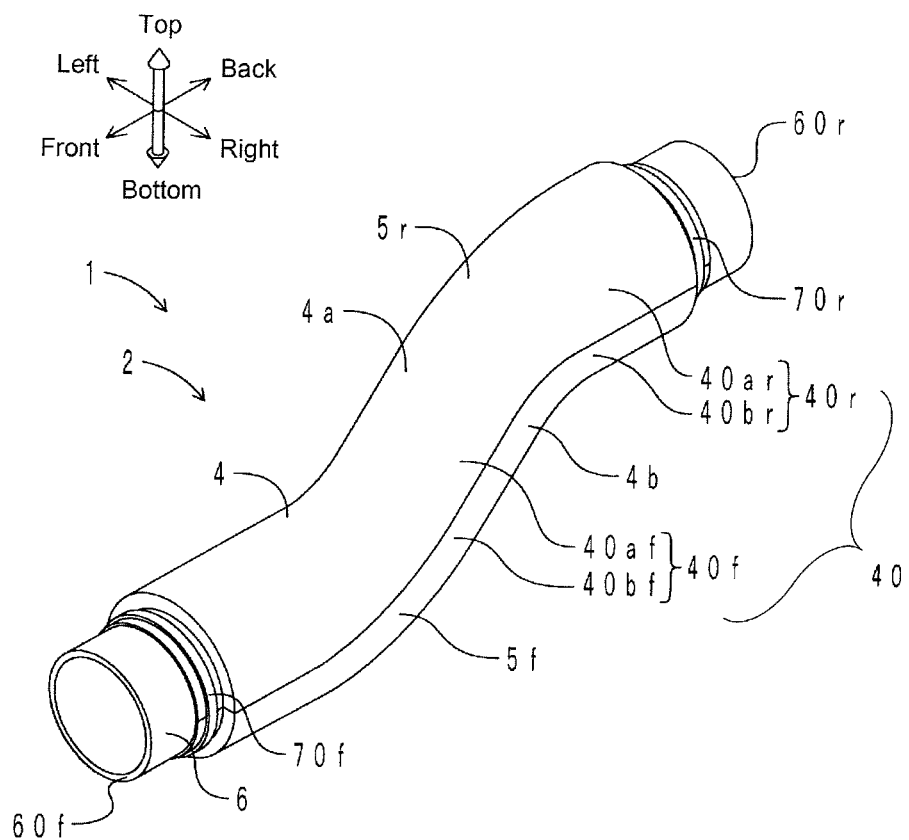
FIG. 2 is a perspective view of the covered tubular body.
Figure 3:
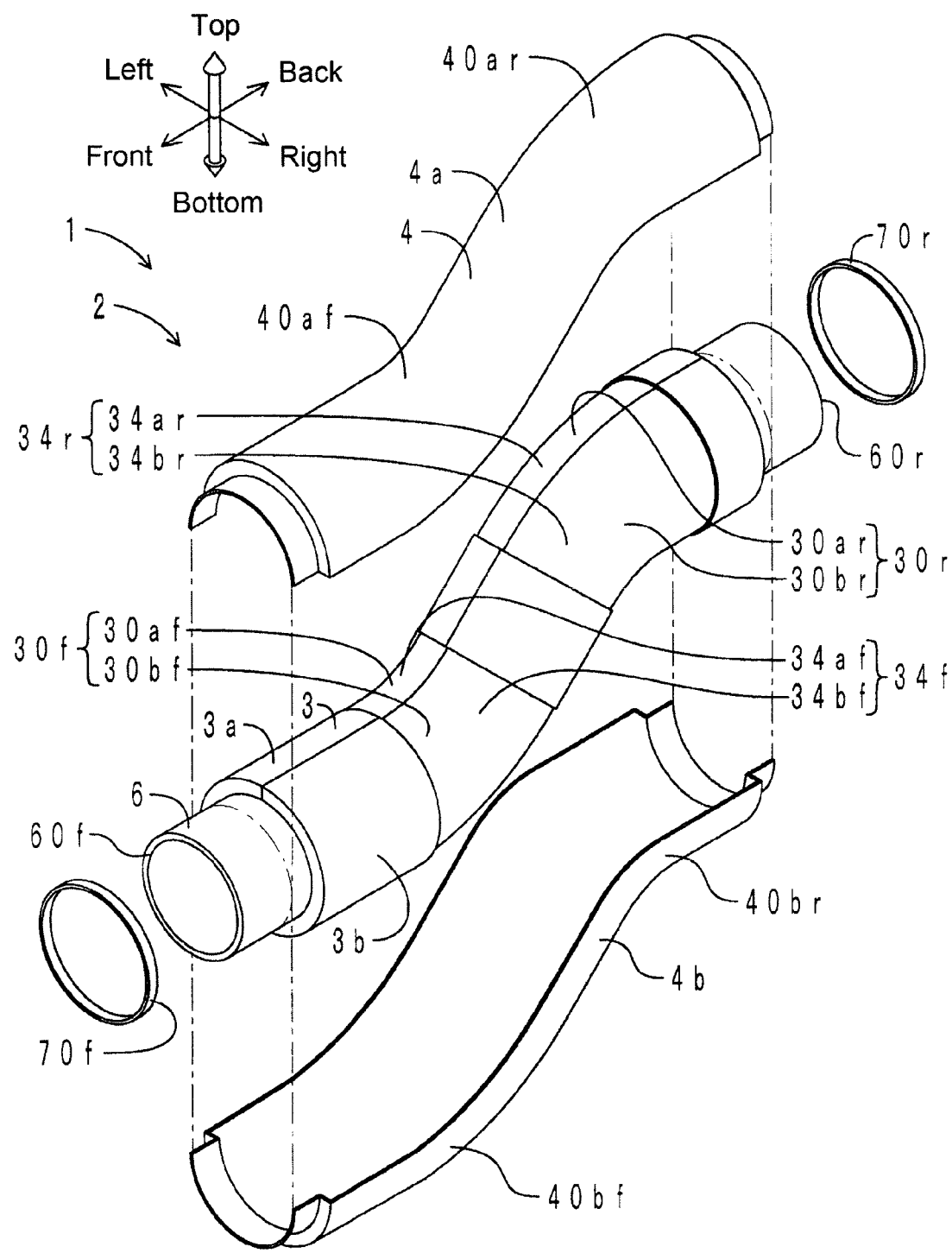
FIG. 3 is an exploded perspective view of the covered tubular body in a state in which a skin layer is removed.
Figure 4:
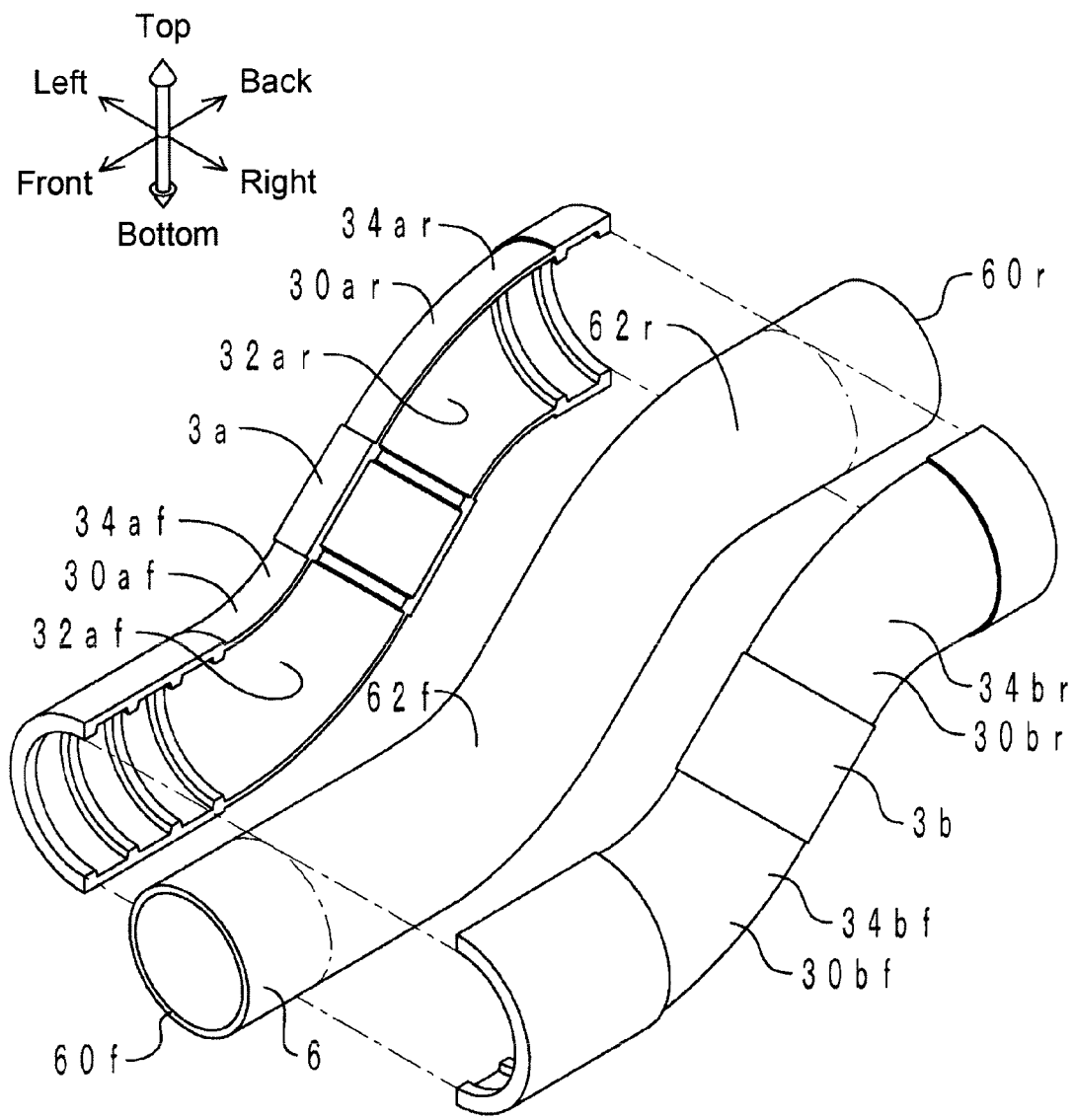
FIG. 4 is an exploded perspective view of the covered tubular body in a state in which a sound absorbing layer is removed.
Figure 5:
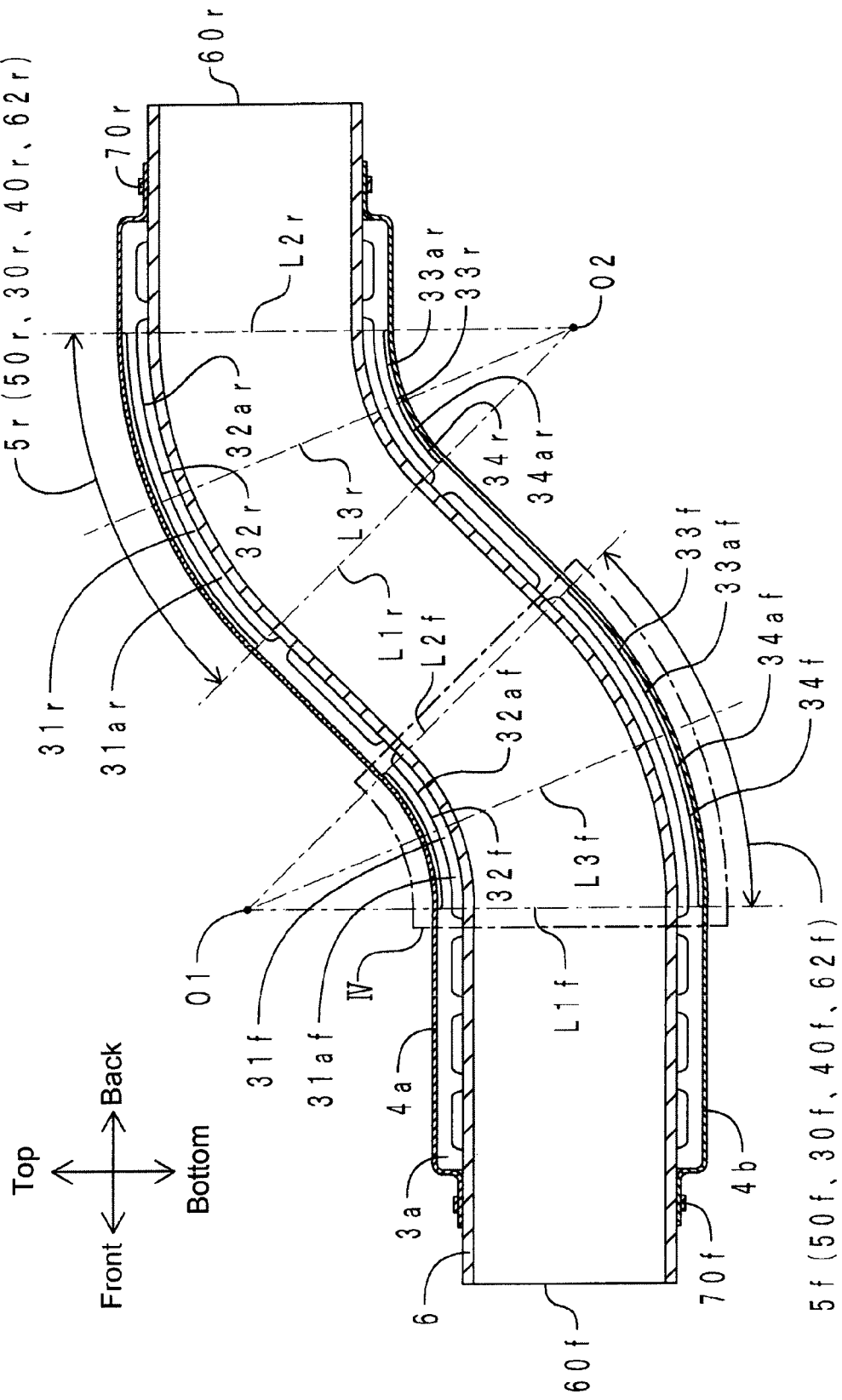
FIG. 5 is an axial cross-sectional view of the covered tubular body.
Figure 6:
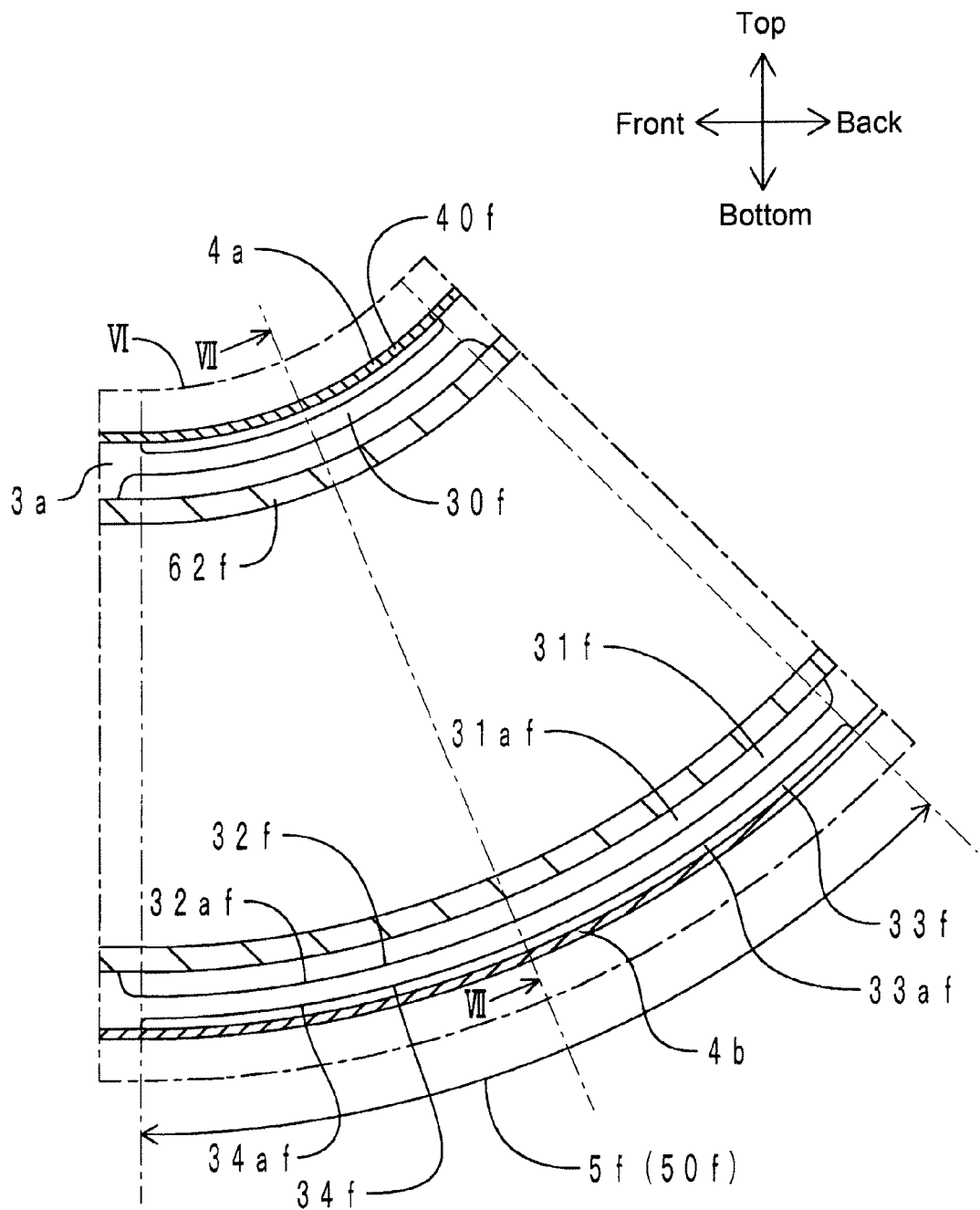
FIG. 6 is an enlarged view of the inside of a frame VI in FIG. 5.
Figure 7:
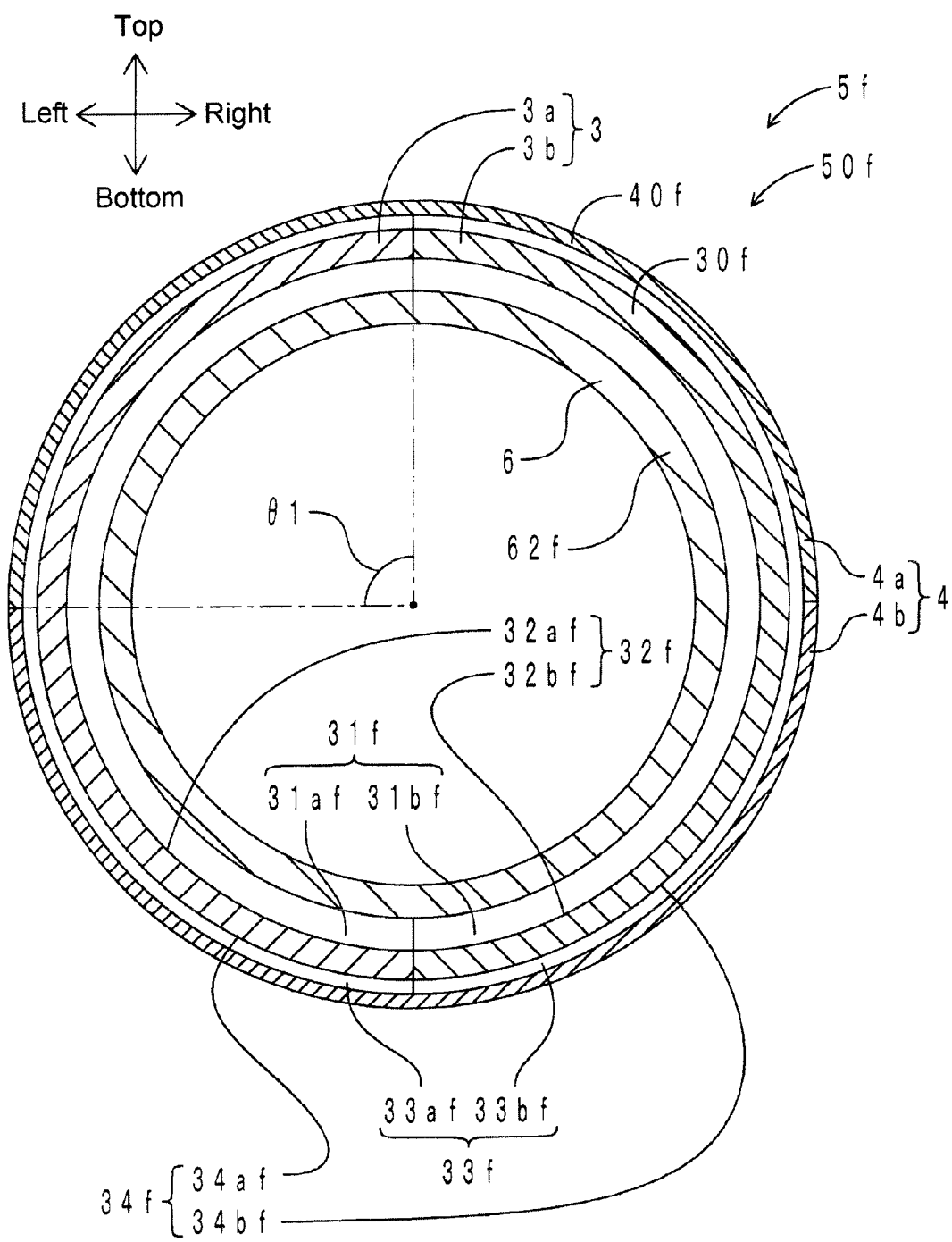
FIG. 7 is a cross-sectional view in a VII-VII direction in FIG. 6.

FIG. 2 illustrates a perspective view of the covered tubular body of the present embodiment. FIG. 3 illustrates an exploded perspective view of the covered tubular body in a state in which a skin layer is removed. FIG. 4 illustrates an exploded perspective view of the covered tubular body in a state in which a sound absorbing layer is removed. FIG. 5 illustrates an axial cross-sectional view of the covered tubular body. FIG. 6 illustrates an enlarged view of the inside of a frame VI in FIG. 5. FIG. 7 illustrates a cross-sectional view in a VII-VII direction in FIG. 6.

As FIGS. 1-7 illustrate, the covered tubular body 1 of the present embodiment includes a turbo air hose 6 and a tubular body soundproof cover 2.

[Turbo Air Hose 6]

The turbo air hose 6 is included in the concept of "tubular body" of the present invention. The turbo air hose 6 is made of AEM (ethylene-acrylic rubber) and has a long cylindrical shape. Due to vibration of the engine 83, the turbo air hose 6 vibrates. That is, due to the vibration of the engine 83, the relative positional relationship between an upstream end (one axial end) 60f and a downstream end (other axial end) 60r of the turbo air hose 6 changes.

Between the upstream end 60f and the downstream end 60r of the turbo air hose 6, two front and rear tubular body side curved sections 62f and 62r are provided. The two tubular body side curved sections 62f and 62r each have a constant curvature. A curvature center O1 of the tubular body side curved section 62f is set to be on an upper side of the tubular body side curved section 62f. The tubular body side curved section 62f extends over a section of a center angle of 45° centered on the curvature center O1. A curvature center O2 of the tubular body side curved section 62r is set to be on a lower side of the tubular body side curved section 62r. The tubular body side curved section 62r extends over a section of a center angle of 45° centered on the curvature center O2.

[Tubular Body Soundproof Cover 2]

The tubular body soundproof cover 2 includes a sound absorbing layer 3, a skin layer 4, cover side curved sections 5f and 5r, and fastener rings 70f and 70r.

(Sound Absorbing Layer 3)

The sound absorbing layer 3 is formed by joining a first sound absorbing layer side segment 3a and a second sound absorbing layer side segment 3b in a circumferential direction. The first sound absorbing layer side segment 3a and the second sound absorbing layer side segment 3b are each included in the concept of "sound absorbing layer side segment" of the present invention. The sound absorbing layer 3 is made of a urethane foam molded product and has a long cylindrical shape. That is, the first sound absorbing layer side segment 3a and the second sound absorbing layer side segment 3b are each made by foam-molding. The sound absorbing layer 3 covers an outer peripheral surface of turbo air hose 6. The sound absorbing layer 3 is arranged over substantially the entire axial length of the turbo air hose 6. The sound absorbing layer 3 and the turbo air hose 6 are not bonded.

The first sound absorbing layer side segment 3a covers a section of 180° on the left side of the turbo air hose 6. In the first sound absorbing layer side segment 3a, two front and rear first sound absorbing layer side sections 30af and 30ar are provided. The two first sound absorbing layer side sections 30af and 30ar each have a constant curvature.

The curvature center O1 of the first sound absorbing layer side section 30af is set to be on the upper side of the first sound absorbing layer side section 30af. The first sound absorbing layer side section 30af extends over a section of a center angle of 45° centered on the curvature center O1.

On an inner peripheral surface of the first sound absorbing layer side section 30af, a first inner recess 32af is provided semicircularly over the entire axial length of the first sound absorbing layer side section 30af. The first inner recess 32af opens inward in a radial direction (corresponding to the "axially perpendicular direction" in the present invention). The opening of the first inner recess 32af is sealed by the outer peripheral surface of the tubular body side curved section 62f. Inside the first inner recess 32af, a first inner clearance 31af is provided.

On an outer peripheral surface of the first sound absorbing layer side section 30af, a first outer recess 34af is provided semicircularly over substantially the entire axial length of the first sound absorbing layer side section 30af. The first outer recess 34af opens outward in the radial direction. The opening of the first outer recess 34af is sealed by the inner peripheral surface of the first skin layer side section 40af of the first skin layer side segment 4a, which is described later. Inside the first outer recess 34af, a first outer clearance 33af is provided.

The configuration of the first sound absorbing layer side section 30ar is the same as the configuration of the first sound absorbing layer side section 30af. The arrangement state of the first sound absorbing layer side section 30ar is a state obtained by rotating the arrangement state of the first sound absorbing layer side section 30af for 180° around the curvature center O1. The curvature center O2 of the first sound absorbing layer side section 30ar is set to be on the lower side of the first sound absorbing layer side section 30ar. The first sound absorbing layer side section 30*ar* extends over a section of a center angle of 45° centered on the curvature center O2.

On the inner peripheral surface of the first sound absorbing layer side section 30*ar*, a first inner recess 32*ar* is provided. Inside the first inner recess 32*ar*, a first inner clearance 31*ar* is provided. On the outer peripheral surface of the first sound absorbing layer side section 30*ar*, a first outer recess 34*ar* is semicircularly provided. Inside the first outer recess 34*ar*, a first outer clearance 33*ar* is provided.

The second sound absorbing layer side segment 3*b* covers a section of 180° on the right side of the turbo air hose 6. The configuration of the second sound absorbing layer side segment 3*b* is the same as the configuration of the first sound absorbing layer side segment 3*a*. The arrangement state of the second sound absorbing layer side segment 3*b* is bilaterally symmetric with respect to the arrangement state of the first sound absorbing layer side segment 3*a*.

By joining the first sound absorbing layer side segment 3*a* and the second sound absorbing layer side segment 3*b*, the sound absorbing layer 3 is formed over the entire circumferential length. The seam between the first sound absorbing layer side segment 3*a* and the second sound absorbing layer side segment 3*b* extends in the vertical direction.

(Skin Layer 4)

The skin layer 4 is formed by joining a first skin layer side segment 4*a* and a second skin layer side segment 4*b* in the circumferential direction. The first skin layer side segment 4*a* and the second skin layer side segment 4*b* are each included in the concept of "skin layer side segment" of the present invention. The skin layer 4 is made of a PVC sheet and has a long cylindrical shape. The first skin layer side segment 4*a* and the second skin layer side segment 4*b* are each produced by injection molding. That is, the first sound absorbing layer side segment 3*a* and the second sound absorbing layer side segment 3*b* are separately produced. The skin layer 4 covers the outer peripheral surface of the sound absorbing layer 3. The skin layer 4 is arranged over the entire axial length of the sound absorbing layer 3. The skin layer 4 and the sound absorbing layer 3 are not bonded.

The first skin layer side segment 4*a* covers a section of 180° on the upper side of the sound absorbing layer 3. In the first skin layer side segment 4*a*, two front and rear first skin layer side sections 40*af* and 40*ar* are provided. The two first skin layer side sections 40*af* and 40*ar* each have a constant curvature.

The curvature center O1 of the first skin layer side section 40*af* is set to be on the upper side of the first skin layer side section 40*af*. The first skin layer side section 40*af* extends over a section of a center angle of 45° centered on the curvature center O1. The first skin layer side section 40*af* is curved to conform to the shape of the outer peripheral surface of a section of 180° on the upper side of the sound absorbing layer side section 30*f*.

The curvature center O2 of the first skin layer side section 40*ar* is set to be on the lower side of the first skin layer side section 40*ar*. The first skin layer side section 40*ar* extends over a section of a center angle of 45° centered on the curvature center O2. The first skin layer side section 40*ar* is curved to conform to the shape of the outer peripheral surface of a section of 180° on the upper side of the sound absorbing layer side section 30*r*.

The second skin layer side segment 4*b* covers a section of 180° on the lower side of the sound absorbing layer 3. In the second skin layer side segment 4*b*, two front and rear second skin layer side sections 40*bf* and 40*br* are provided. The two second skin layer side sections 40*bf* and 40*br* each have a constant curvature.

The curvature center O1 of the second skin layer side section 40*bf* is set to be on the upper side of the second skin layer side section 40*bf*. The second skin layer side section 40*bf* extends over a section of a center angle of 45° centered on the curvature center O1. The second skin layer side section 40*bf* is curved to conform to the shape of the outer peripheral surface of a section of 180° on the lower side of the sound absorbing layer side section 30*f*.

The curvature center O2 of the second skin layer side section 40*br* is set to be on the lower side of the second skin layer side section 40*br*. The second skin layer side section 40*br* extends over a section of a center angle of 45° centered on the curvature center O2. The second skin layer side section 40*br* is curved to conform to the shape of the outer peripheral surface of a section of 180° on the lower side of the sound absorbing layer side section 30*r*.

By joining the first skin layer side segment 4*a* and the second skin layer side segment 4*b*, the skin layer 4 is formed over the entire circumferential length. The seam between the first skin layer side segment 4*a* and the second skin layer side segment 4*b* extends in the bilateral direction. That is, as FIG. 7 illustrates, the seam between the first sound absorbing layer side segment 3*a* and the second sound absorbing layer side segment 3*b* and the seam between the first skin layer side segment 4*a* and the second skin layer side segment 4*b* are arranged at positions shifted by a center angle $\theta 1=90°$.

(Fastener Rings 70*f* and 70*r*)

The fastener ring 70*f* secures an upstream end of the skin layer 4 to the upstream end 60*f* of the turbo air hose 6. The fastener ring 70*r* secures a downstream end of the skin layer 4 to the downstream end 60*r* of the turbo air hose 6. That is, the tubular body soundproof cover 2 is installed on the turbo air hose 6 by the fastener rings 70*f* and 70*r*. The first skin layer side segment 4*a* and the second skin layer side segment 4*b* are joined together by the fastener rings 70*f* and 70*r* in a state containing the first sound absorbing layer side segment 3*a* and the second sound absorbing layer side segment 3*b* therein.

(Cover Side Curved Sections 5*f* and 5*r*)

The cover side curved section 5*f* is arranged radially outside the tubular body side curved section 62*f*. The cover side curved section 5*f* has a non-adherent section 50*f* extending over the entire axial length. The non-adherent section 50*f* has a sound absorbing layer side section 30*f* and a skin layer side section 40*f*.

The sound absorbing layer side section 30*f* is formed by joining the first sound absorbing layer side section 30*af* and the second sound absorbing layer side section 30*bf*. On the inner peripheral surface of the sound absorbing layer side section 30*f*, by joining the first inner recess 32*af* and the second inner recess 32*bf*, an inner recess 32*f* is provided over the entire circumferential length. Inside the inner recess 32*f*, by joining the first inner clearance 31*af* and the second inner clearance 31*bf*, an inner clearance 31*f* is provided over the entire circumferential length.

On the outer peripheral surface of the sound absorbing layer side section 30*f*, by joining the first outer recess 34*af* and the second outer recess 34*bf*, an outer recess 34*f* is provided over the entire circumferential length. Inside the outer recess 34*f*, by joining the first outer clearance 33*af* and the second outer clearance 33*bf*, an outer clearance 33*f* is provided over the entire circumferential length.

The configuration of the cover side curved section 5*r* is the same as the configuration of the cover side curved section 5*f*.

The arrangement state of the cover side curved section 5r is a state obtained by rotating the arrangement state of the cover side curved section 5f for 180° around the curvature center O1.

The cover side curved section 5r is arranged radially outside the tubular body side curved section 62r. The cover side curved section 5r has a non-adherent section 50r. The non-adherent section 50r has the sound absorbing layer side section 30r (the first sound absorbing layer side section 30ar and the second sound absorbing layer side section 30br) and a skin layer side section 40r (the first skin layer side section 40ar and the second skin layer side section 40br).

On the inner peripheral surface of the sound absorbing layer side section 30r, an inner recess 32r (the first inner recess 32ar and a second inner recess) is provided. Inside the inner recess 32r, an inner clearance 31r (the first inner clearance 31ar and a second inner clearance) is provided.

On the outer peripheral surface of the sound absorbing layer side section 30r, an outer recess 34r (the first outer recess 34ar and the second outer recess 34br) is provided. Inside the outer recess 34r, an outer clearance 33r (the first outer clearance 33ar and a second outer clearance) is provided.

[Operation Effect]

Next, an operation effect of the tubular body soundproof cover 2 and the covered tubular body 1 of the present embodiment is explained. According to the tubular body soundproof cover 2 and the covered tubular body 1 of the present embodiment, the sound absorbing layer 3 is made of a urethane foam molded product. For this reason, the sound absorbing layer 3 extends and contracts easily. That is, the sound absorbing layer 3 is unlikely to restrict the deformation of the tubular air hose 6. In contrast, the skin layer 4 is made of a PVC sheet. For this reason, as compared to the sound absorbing layer 3, it is unlikely for the skin layer 4 to extend and contract. That is, the skin layer 4 is likely to restrict the deformation of the sound absorbing layer 3.

Here, of the turbo air hose 6, those having a large deformation amount are the tubular body side curved sections 62f and 62r. In other words, of the turbo air hose 6, those having a large amount of change in relative positional relationship to absorb are the tubular body side curved sections 62f and 62r.

In this regard, the cover side curved sections 5f and 5r of the tubular body soundproof cover 2 of the present embodiment cover the tubular body side curved sections 62f and 62r from radially outside. In the non-adherent sections 50f and 50r of the cover side curved sections 5f and 5r, the sound absorbing layer 3 and the skin layer 4 are not bonded over the entire circumferential length. For this reason, the deformation of the sound absorbing layer 3 is unlikely to be restricted by the skin layer 4. Therefore, the elastic deformation of the tubular body side curved sections 62f and 62r is unlikely to be restricted by the skin layer 4.

Further, as FIG. 5 illustrates, the non-adherent sections 50f and 50r are provided from 0% positions to 100% positions, where the 0% positions are the one axial ends L1f and L1r of the cover side curved sections 5f and 5r and the 100% positions are the other axial ends L2f and L2r of the cover side curved sections 5f and 5r. That is, of the entire axial lengths of the cover side curved sections 5f and 5r, the non-adherent sections 50f and 50r are provided to include sections of ±50% centered at 50% positions L3f and L3r. For this reason, the elastic deformation of the turbo air hose 6 is unlikely to be restricted.

Further, according to the tubular body soundproof cover 2 and the covered tubular body 1 of the present embodiment, on the inner peripheral surfaces of the sound absorbing layer side sections 30f and 30r, the inner recesses 32f and 32r are arranged over the entire axial lengths and the entire circumferential lengths of the non-adherent sections 50f and 50r. Further, inside the inner recesses 32f and 32r, the inner clearances 31f and 31r are provided. For this reason, the contact areas between the outer peripheral surfaces of the tubular body side curved sections 62f and 62r and the inner peripheral surfaces of the sound absorbing layer side sections 30f and 30r can be made substantially zero. Therefore, the sound absorbing layer 3 is unlikely to restrict the elastic deformation of the turbo air hose 6.

Further, according to the tubular body soundproof cover 2 and the covered tubular body 1 of the present embodiment, on the outer peripheral surfaces of the sound absorbing layer side sections 30f and 30r, the outer recesses 34f and 34r are arranged over the entire axial lengths and the entire circumferential lengths of the non-adherent sections 50f and 50r. Further, inside the outer recesses 34f and 34r, the outer clearances 33f and 33r are provided. For this reason, the contact areas between the outer peripheral surfaces of sound absorbing layer side sections 30f and 30r and the inner peripheral surfaces of the skin layer side sections 40f and 40r can be made substantially zero. For this reason, the skin layer 4 is unlikely to restrict the elastic deformation of the turbo air hose 6.

As the production method of the tubular body soundproof cover 2, a method is known in which, first, a skin layer side segment is placed in a cavity of a mold; next, a raw material is casted into the cavity to foam-mold a sound absorbing layer side segment; and then, a plurality of "bonded portions of the sound absorbing layer side segments and the skin layer side segments" are joined in the circumferential direction. According to this production method, it is difficult to circumferentially shift a seam between circumferentially neighboring skin layer side segments and a seam between circumferentially neighboring sound absorbing layer side segments. For this reason, the two seams are joined in a shape of a straight line in the axially perpendicular direction. Therefore, sound inside the tubular body easily escapes to the outside.

In contrast, according to the tubular body soundproof cover 2 and the covered tubular body 1 of the present embodiment, the first sound absorbing layer side segment 3a and the second sound absorbing layer side segment 3b are each produced by foam-molding. On the other hand, the first skin layer side segment 4a and the second skin layer side segment 4b are each produced by injection molding. That is, the first skin layer side segment 4a, the second skin layer side segment 4b, the first sound absorbing layer side segment 3a, and the second sound absorbing layer side segment 3b are separately produced.

For this reason, as FIG. 7 illustrates, the seam between the first sound absorbing layer side segment 3a and the second sound absorbing layer side segment 3b and the seam between the first skin layer side segment 4a and the second skin layer side segment 4b can be arranged at positions shifted by the center angle $\theta1=90°$. Therefore, as compared to the case where the two seams are joined in a shape of a straight line, sound inside the turbo air hose 6 is unlikely to escape to the outside.

Second Embodiment

Figure 8:
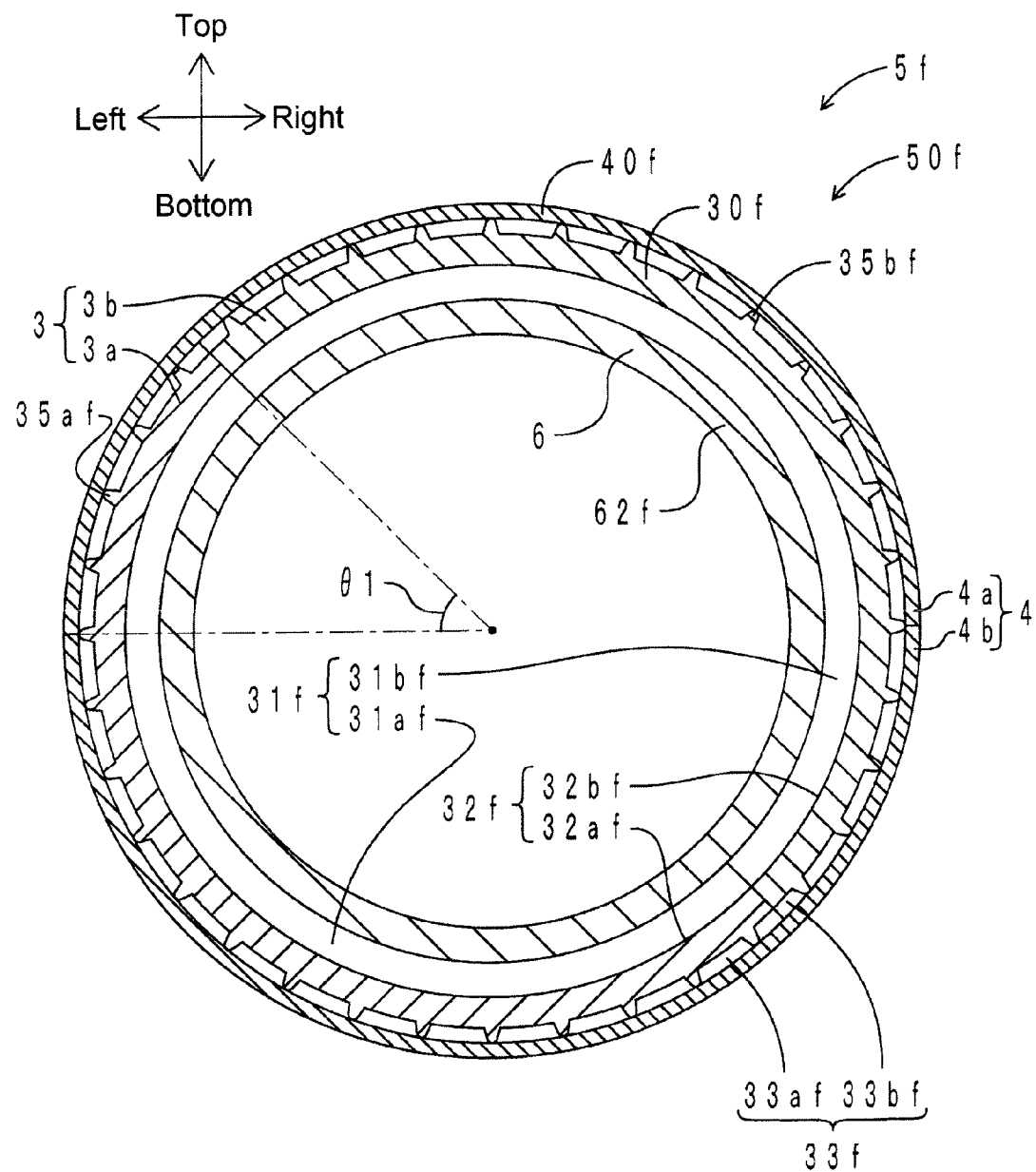
FIG. 8 is a radial cross-sectional view of a covered tubular body according to a second embodiment.

A difference between the present embodiment and the first embodiment is that numerous convex portions are formed on the outer peripheral surface of the sound absorbing layer. Another difference is that the shift angle between the seam between the first sound absorbing layer side segment and the second sound absorbing layer side segment and the seam between the first skin layer side segment and the second skin layer side segment is different. Here, only the differences are explained. FIG. 8 illustrates a radial cross-sectional view of a covered tubular body of the present embodiment. Portions corresponding to those in FIG. 7 are indicated using the same reference numerals.

As FIG. 8 illustrates, on the outer peripheral surface of the first sound absorbing layer side segment 3a, numerous convex portions 35af are provided. Similarly, on the outer peripheral surface of the second sound absorbing layer side segment 3b, numerous convex portions 35bf are provided. Tops of the numerous convex portions 35af and 35bf are in contact with the inner peripheral surface of skin layer 4. That is, by the numerous convex portions 35af and 35bf, the outer clearance 33f is provided between the outer peripheral surface of the sound absorbing layer 3 and the inner peripheral surface of the skin layer 4.

Further, the seam between the first sound absorbing layer side segment 3a and the second sound absorbing layer side segment 3b and the seam between the first skin layer side segment 4a and the second skin layer side segment 4b are arranged at positions shifted by a center angle $\theta 1=45°$.

The tubular body soundproof cover and the covered tubular body of the present embodiment have the same operation effects as the tubular body soundproof cover and the covered tubular body of first embodiment with respect to portions having common configurations. According to the tubular body soundproof cover and the covered tubular body of the present embodiment, the outer clearance 33f can easily be arranged. Further, as in the present embodiment, the center angle $\theta 1$ may also be set to 45°.

Third Embodiment

A difference between the present embodiment and the first embodiment is that the skin layer side section has a thinner radial wall thickness than other parts of the skin layer excluding the skin layer side section. Another difference is that the outer clearance is not arranged. Here, only the differences are explained.

Figure 9:
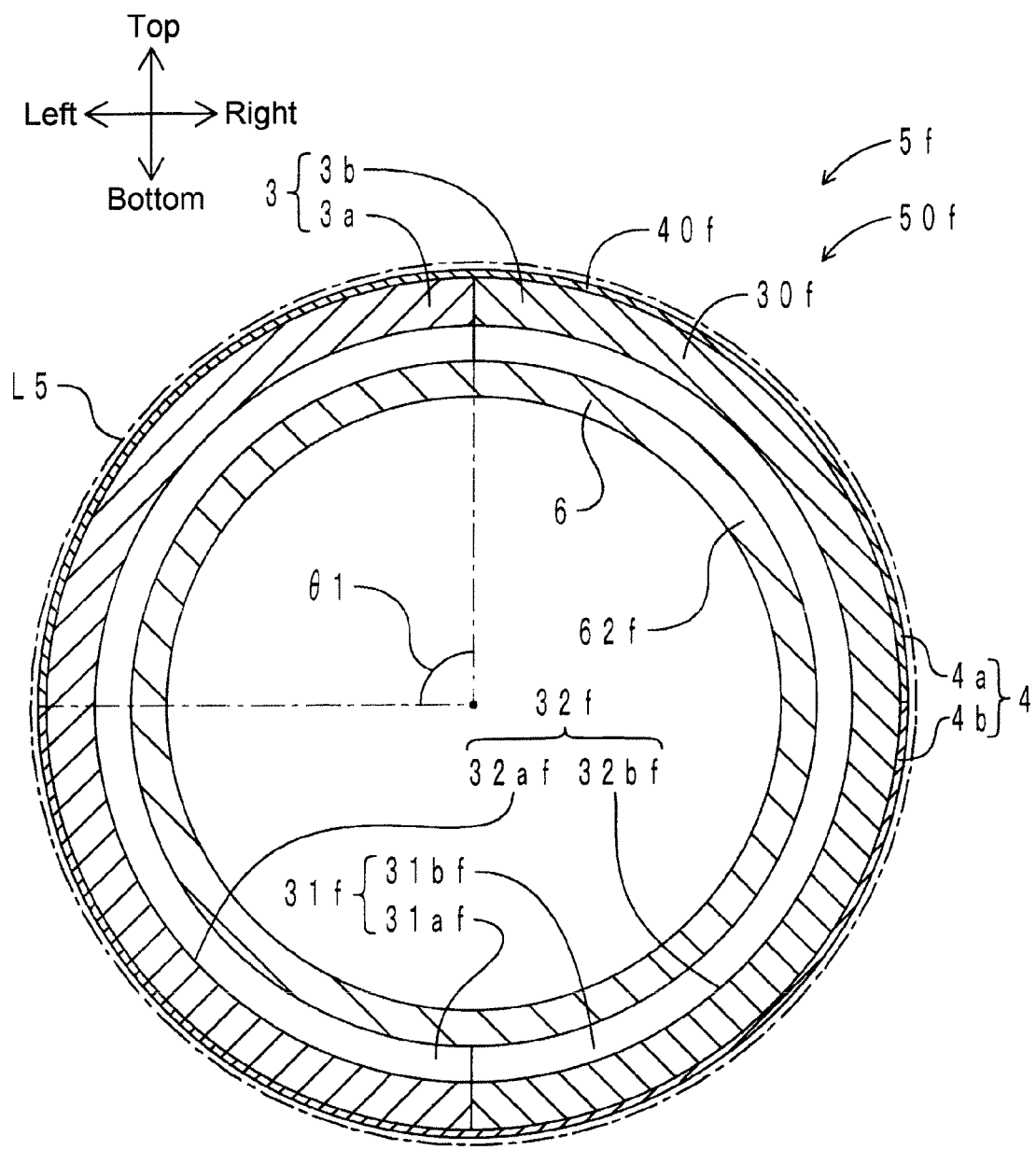
FIG. 9 is a radial cross-sectional view of a covered tubular body according to a third embodiment.

FIG. 9 illustrates a radial cross-sectional view of a covered tubular body of the present embodiment. Portions corresponding to those in FIG. 7 are indicated using the same reference numerals. As FIG. 9 illustrates, the skin layer side section 40f has a thinner radial wall thickness than other parts (illustrated in FIG. 9 using a dashed line L5) of the skin layer 4 excluding the skin layer side section 40f. Further, between the outer peripheral surface of the sound absorbing layer 3 and the inner peripheral surface of the skin layer 4, the outer clearance is not provided. That is, the outer peripheral surface of the sound absorbing layer 3 and the inner peripheral surface of skin layer 4 are entirely in contact with each other. However, the outer peripheral surface of the sound absorbing layer 3 and the inner peripheral surface of the skin layer 4 are not bonded.

The tubular body soundproof cover and the covered tubular body of the present embodiment have the same operation effects as the tubular body soundproof cover and the covered tubular body of first embodiment with respect to portions having common configurations. According to the tubular body soundproof cover and the covered tubular body of the present embodiment, by reducing the radial wall thickness of the skin layer side section 40f, the rigidity of the skin layer side section 40f is reduced. For this reason, the skin layer side section 40f is flexible. Therefore, the skin layer side section 40f is unlikely to restrict the deformation of the sound absorbing layer side section 30f. That is, the skin layer side section 40f is unlikely to restrict the deformation of the tubular body side curved section 62f of the turbo air hose 6.

Fourth Embodiment

Figure 10:
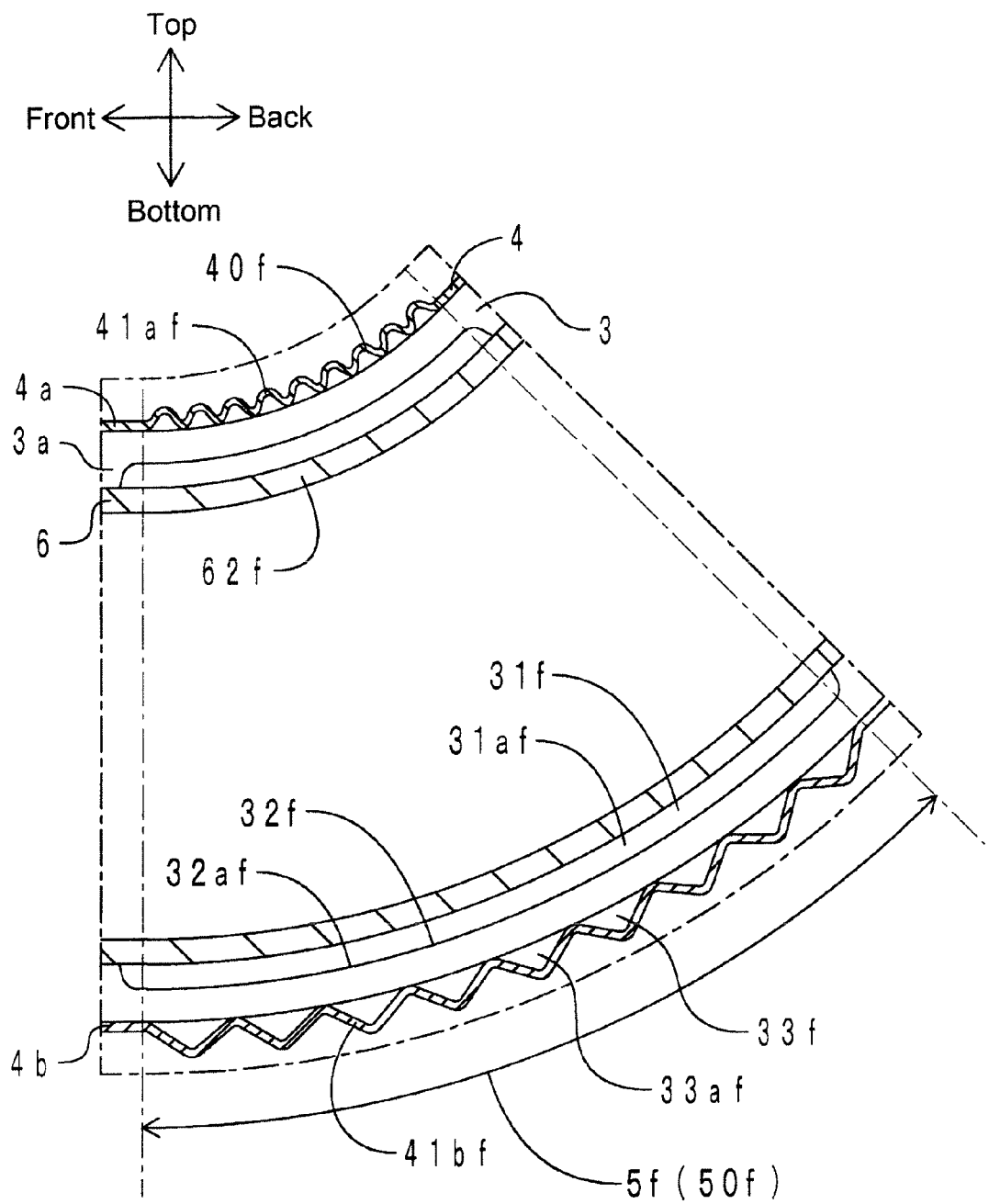
FIG. 10 is a radial enlarged cross-sectional view of a covered tubular body according to a fourth embodiment.

A difference between the present embodiment and the first embodiment is that an axially extendable and contractible bellows portion is arranged in the skin layer side section. Here, only the difference is explained. FIG. 10 illustrates a radially enlarged cross-sectional view of a covered tubular body of the present embodiment. Portions corresponding to those in FIG. 6 are indicated using the same reference numerals.

As FIG. 10 illustrates, in the skin layer side section 40f, bellows portions 41af and 41bf are formed. For this reason, the skin layer side section 40f easily extends and contracts in the axial direction. Further, between the outer peripheral surface of the sound absorbing layer 3 and the inner peripheral surface of the skin layer 4, the outer clearance 33f is provided.

The tubular body soundproof cover and the covered tubular body of the present embodiment have similar operation effects as the tubular body soundproof cover and the covered tubular body of first embodiment with respect to portions having common configurations. According to the tubular body soundproof cover and the covered tubular body of the present embodiment, by arranging the bellows portions 41af and 41bf in the skin layer side section 40, the rigidity of the skin layer side section 40f is reduced. For this reason, the skin layer side section 40f is flexible. Therefore, the skin layer side section 40f is unlikely to restrict the deformation of the sound absorbing layer side section 30f. That is, the skin layer side section 40f is unlikely to restrict the deformation of the tubular body side curved section 62f of the turbo air hose 6.

Further, according to the tubular body soundproof cover and the covered tubular body of the present embodiment, by arranging the bellows portions 41af and 41bf in the skin layer side section 40, the outer clearance 33f is arranged. Also in this respect, the skin layer side section 40f is unlikely to restrict the deformation of the sound absorbing layer side section 30f. That is, the skin layer side section 40f is unlikely to restrict the deformation of the tubular body side curved section 62f of the turbo air hose 6.

Other

In the above, the embodiments of the tubular body soundproof cover and the covered tubular body of the present invention were explained. However, an embodiment is not particularly limited by the above-described embodiments. The present invention can also be carried out in various modified and improved modes by a person skilled in the art.

Figure 11:
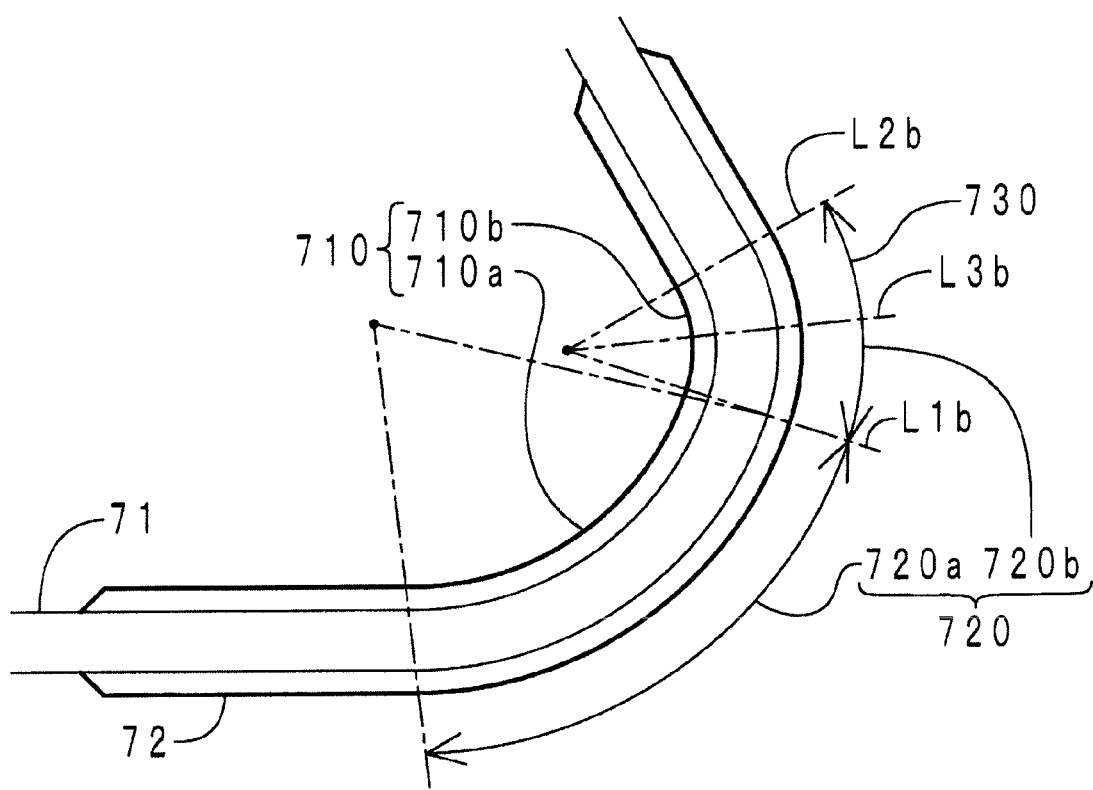
FIG. 11 is a schematic view of a covered tubular body according to another embodiment.

FIG. 11 illustrates a schematic view of a covered tubular body of another embodiment. As FIG. 11 illustrates, a tubular body side curved section 710 of a tubular body 71 is formed from two unit sections 710a and 710b bending toward the same direction. That is, it is also possible to form a cover side curved section 720 of a tubular body soundproof cover 72 from two unit sections 720a and 720b bending toward the same direction. The unit section 720b has a larger curvature than the unit section 720a. In this case, a non-adherent section 730 may be arranged on the unit section 720b.

In FIG. 11, the non-adherent section 730 is provided ranging from a 0% position to a 100% position, where the 0% position is one axial end L1b of the unit section 720b and the 100% position is another axial end L2b of the unit section 720b. That is, of the entire axial length of the unit section 720b, the non-adherent section 730 is provided to include a section of ±50% centered at a 50% position L3b. For this reason, the tubular body soundproof cover 72 is unlikely to restrict the elastic deformation of tubular body 71.

The material of the tubular body is not particularly limited. For example, metals such as stainless and aluminum, elastomer (including rubber), resin, and the like can be used. That is, as the material of the turbo air hose 6, rubber other than AEM (for example, silicone rubber, fluorine-containing rubber, and the like) can be used. The turbo air hose 6 may also be produced by laminating different kinds of rubbers in the radial direction. In this case, a reinforced fiber layer may be interposed between radially neighboring rubber layers.

The material of the sound absorbing layer 3 is not particularly limited. For example, a flexible porous body such as a foam molded product (urethane foam molded product and the like), fiber-based sound absorbing material (glass wool and the like), and the like can be used. The material of the skin layer 4 is not particularly limited. Resin, elastomer, and the like can be used. For example, PVC, TPU (thermoplastic urethane resin), TPO (olefinic elastomer), and the like can be used. Further, the bending rigidity of the skin layer 4 may be smaller than the bending rigidity of the sound absorbing layer 3. In this case, the skin layer 4 becomes more flexible than the sound absorbing layer 3. For this reason, the deformation of the sound absorbing layer 3 is unlikely to be restricted by the skin layer 4. Therefore, the elastic deformation of the tubular body side curved sections 62f and 62r is unlikely to be restricted by the skin layer 4.

In the above embodiments, the non-adherent sections 50f and 50r are arranged on the tubular body side curved sections 62f and 62r. However, the non-adherent sections 50f and 50r may also be arranged on a stress concentration section (including the tubular body side curved sections 62f and 62r) of the tubular body. The stress concentration section can be identified by performing a FEM (Finite Element Method) analysis and the like.

The shape of the tubular body is not particularly limited. In addition to a cylindrical shape (true cylindrical shape, elliptic cylindrical shape), a polygonal tubular shape (triangular tubular shape, rectangular tubular shape, hexagonal tubular shape, and the like) is also possible. Further, it is also possible that the non-adherent sections 50f and 50r are not provided over the entire axial lengths of the cover side curved sections 5f and 5r, but over only portions of the entire axial lengths.

It is also possible that the outer recesses 34f and 34r and the outer clearances 33f and 33r are not arranged over the entire axial lengths of the non-adherent sections 50f and 50r. Outer recesses may also be provided on the inner peripheral surface of the skin layer 4. Outer clearances may also be arranged via these outer recesses. Numerous convex portions may also be provided on the inner peripheral surface of the skin layer 4. Outer clearances may also be arranged via these convex portions.

Further, outer clearances may also be arranged by providing ribs projecting radially on at least one of the outer peripheral surface of the sound absorbing layer 3 and the inner peripheral surface of the skin layer 4. The extending direction of the ribs is not particularly limited, and may be the circumferential direction, the axial direction, a helical direction, or the like. The ribs may also extend in a lattice shape.

Further, in place of the fastener rings 70f and 70f, clips, hook-and-loop fasteners such as Velcro tapes (registered trademark), adhesive (single-sided, double-sided) tapes, and the like may be used to install the skin layer 4 to the turbo air hose 6.

Further, a stapler such as a Hotchkiss, hook-and-loop fasteners such as Velcro tapes (registered trademark), adhesive (single-sided, double-sided) tapes, and the like may be used to join the first sound absorbing layer side segment 3a and the second sound absorbing layer side segment 3b or the first skin layer side segment 4a and the second skin layer side segment 4b. Further, the first sound absorbing layer side segment 3a and the second sound absorbing layer side segment 3b or the first skin layer side segment 4a and the second skin layer side segment 4b may be welded together.

Further, the covered tubular body of the present invention may also be arranged at the hatched portion in FIG. 1 (on the upstream side of the intercooler 80). Further, the arrangement numbers of the sound absorbing layer side segments and the skin layer side segments are not particularly limited. Further, endless circular-shaped sound absorbing layer 3 and skin layer 4 may also be used.

Further, in addition to the turbo air hose 6, the tubular body soundproof cover of the present invention can also be installed to air intake piping, coolant piping, and the like that connect between the devices configuring the air intake system 8.

What is claimed is:

1. A tubular body soundproof cover comprising:
a sound absorbing layer arranged on outside in an axially perpendicular direction of a tubular body, the tubular body having two axial ends and a tubular body side curved section provided between the two axial ends, the two axial ends having a changing relative positional relationship, the axially perpendicular direction being perpendicular to an axial direction of the tubular body;
a skin layer arranged on outside in the axially perpendicular direction of the sound absorbing layer; and
a cover side curved section arranged on outside in the axially perpendicular direction of the tubular body side curved section, including at least a portion of the sound absorbing layer and at least a portion of the skin layer,
wherein the cover side curved section has a non-adherent section where the sound absorbing layer and the skin layer are not bonded over wherein the non-adherent section is provided at an outer periphery of the sound absorbing layer.

2. The tubular body soundproof cover according to claim 1, wherein
the cover side curved section has a constant curvature; and
the non-adherent section is provided to include a section ranging from a 30% position to a 70% position when one axial end of the cover side curved section is a 0% position and the other axial end of the cover side curved section is a 100% position.

3. The tubular body soundproof cover according to claim 1, wherein
the cover side curved section is formed by joining a plurality of unit sections in the axial direction, the plurality of unit sections being curved toward a same direction; and
the non-adherent section is provided to be a unit section having a largest curvature among the plurality of unit sections.

4. The tubular body soundproof cover according to claim 3, wherein the non-adherent section is provided to include a section ranging from a 30% position to a 70% position when one axial end of the unit section having the largest curvature is a 0% position and the other axial end of the unit section having the largest curvature is a 100% position.

5. The tubular body soundproof cover according to claim 1, wherein the sound absorbing layer has a sound absorbing layer side section included in the non-adherent section; and an inner recess is provided on an inner peripheral surface of the sound absorbing layer side section, providing an inner clearance between an outer peripheral surface of the tubular body side curved section and the inner peripheral surface of the sound absorbing layer side section over an entire axial length and an entire circumferential length of the non-adherent section.

6. The tubular body soundproof cover according to claim 1, wherein the sound absorbing layer has a sound absorbing layer side section included in the non-adherent section;

the skin layer has a skin layer side section included the non-adherent section; and an outer clearance is provided between an outer peripheral surface of the sound absorbing layer side section and an inner peripheral surface of the skin layer side section, the outer clearance occupying at least a portion of the non-adherent section.

7. The tubular body soundproof cover according to claim 1, wherein the skin layer has a skin layer side section included in the non-adherent section, the skin layer side section having a lower rigidity than other portions of the skin layer excluding the skin layer side section.

8. The tubular body soundproof cover according to claim 1, wherein the sound absorbing layer is formed from a plurality of sound absorbing layer side segments joining in the circumferential direction;

the skin layer is formed from a plurality of skin layer side segments joining in the circumferential direction; and seams between circumferentially neighboring sound absorbing layer side segments and seams between circumferentially neighboring skin layer side segments are arranged at positions circumferentially shifted from each other.

9. A covered tubular body comprising:

a tubular body soundproof cover according to claim 1; and a tubular body having the tubular body soundproof cover installed on an outer peripheral surface of the tubular body.

* * * * *